Aug. 18, 1953 — A. W. SALOKAR — 2,648,930
ANIMAL TRAP

Filed March 29, 1952 — 2 Sheets-Sheet 1

INVENTOR.
ANDREW W. SALOKAR
BY
*J. B. Telshin*
HIS ATTORNEY

Aug. 18, 1953  A. W. SALOKAR  2,648,930
ANIMAL TRAP

Filed March 29, 1952  2 Sheets-Sheet 2

INVENTOR.
ANDREW W. SALOKAR
BY
HIS ATTORNEY

UNITED STATES PATENT OFFICE 2,648,930

ANIMAL TRAP

Andrew W. Salokar, Miami, Fla.

Application March 29, 1952, Serial No. 279,271

11 Claims. (Cl. 43—81)

This invention relates to animal traps, and particularly to traps for rats and mice, and has for its main object to provide a device of this type which will have improved construction and operation over similar devices heretofore proposed.

Still another object of this invention is to provide an animal trap as heretofore described and which has a bar that conceals an open space below a rocking plate of the trap.

Still a further object of this invention is to provide an animal trap which will be extremely sensitive and quick in action, whereby the slightest touch of the platform, bait-carrying plain portion, without even the necessity of reaching the bait thereon, will cause the striker bar to descend on the animal with a lightning speed, due to the surprising force or leverage force principle applied herein.

My novel animal trap will include an extremely strong striker bar of novel construction held in place by a trigger that is substantially shorter than that which is conventionally used and a highly sensitive trigger actuating mechanism for the same adapted to cause said trigger to be pushed, thus releasing said striker bar and causing it to strike on the animal with extreme suddenness and sure aim.

Still further objects of my invention will be apparent as the specification of the same proceeds, or will be pointed out herein, and, among others I may mention: to provide a device as characterized hereinbefore, which will be simple in construction, inexpensive to manufacture, easy to set and lock, and efficient in operation and use.

In the drawings forming a part of this specification and accompanying the same:

Figure 1:
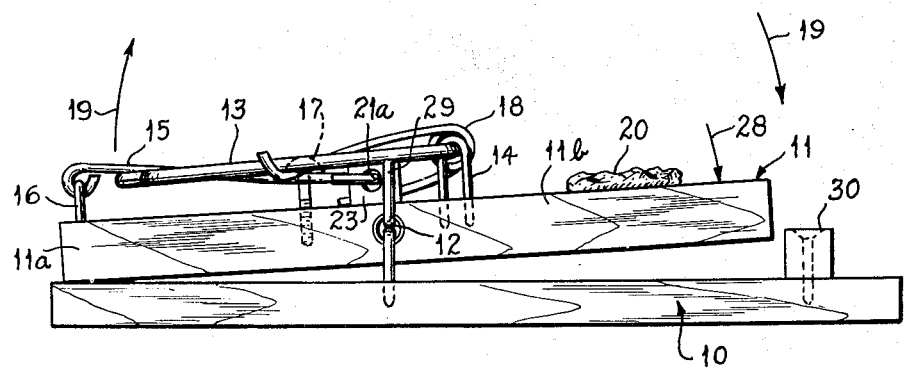
Fig. 1 is a side view of the preferred embodiment of my novel rat trap.

Referring now to the drawings more in detail by characters of reference, 10 indicates a base plate, preferably of wood, and 11 a rocking plate pivoted on it, as at 12, by means presently to be described.

A heavy wire trap frame or striker bar 13 is pivoted on plate 11, as arranged under wire loops 14, and to set the trap, said striker bar is turned over the left (somewhat shorter) portion 11a of plate 11 and kept locked on it by a trigger 15. Said trigger is pivoted as on a wire loop 16 and is locked under the head of screw 17. A strong spring 18 is adapted to snap the striker bar 13 over the free or bait side 11b of the plate 11 as soon as trigger 15 is released from under screw head 17. Arrow 19 (Fig. 1) indicates the swing of striker bar 13.

When the device is set locked (Figs. 1 and 2), plate 11 tilts to the left, and its free side or section 11b is inclined upwardly. Bait 20 is placed on the section 11b on the platform and at any portion thereof.

The trigger actuating mechanism simply consists of a pin, wire or rod 21 slidable in guide brackets 22 and 23. It has a nut 24 screwed onto said rod 21 by means of threads 24a and a spring 25 has a tendency to push it inwardly (arrow 26). Against said spring it may be pulled outwardly and, by a transverse slot 27 in it, hooked into the guide bracket 23.

When the animal touches the bait-carrying portion 11b of the plate 11, it will tilt downwardly (arrow 28). The outer portion 21a of trigger actuating rod 21 is then caused to strike an upstanding pin 29 on the base 11 and is slightly moved to the left, thereby releasing slot 27, and the rod 21 then moves inwardly through the action of spring 25 (arrow 26) and pushes the trigger 15 from under head 17 (arrow 26). Striker bar 13 will now be released and will suddenly swing over to the right (arrow 19) and will catch the animal. The strength of spring 25 is regulated by turning the nut 24 on threads 24a.

A bar 30 is placed across and in front of an open space over base 10 and under and in front of the side 11b of plate 11 to conceal said open space which would make the animal suspicious of a trap. Said bar will also aid the animal to reach the innocent looking, plain, free portion 11b with the bait 20 thereon, a touching of which will cause the striker bar 13 to descend on the animal.

It also may be noted that in my preferred construction, as shown in the drawings, the pivot 12 for the trap plate 11 is formed by a wire 40 secured into the base plate 10 as at 41, and then turned transversely passing into a hole or aperture 42 in the trap plate. Another wire 43 is secured in the base plate at the other side of the trap plate 11 and turned inwardly, as at 44, into an opposite aperture 42, the inwardly turning portions of the wires 40 and 43 forming the pivot axis for the trap plate 11. In this construction, also, I prefer to turn the inner end of the wire 44 outwardly at the side of the trap plate 11 and then upwardly to form the stationary member 29 for releasing the trigger, as has been described hereinbefore.

Figure 2:
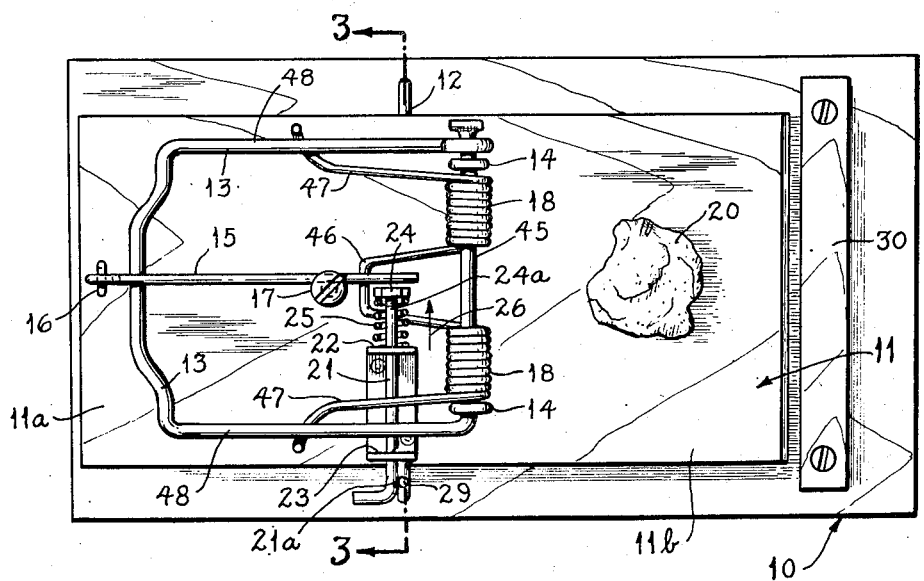
Fig. 2 is a plan view thereof.
Figure 3:
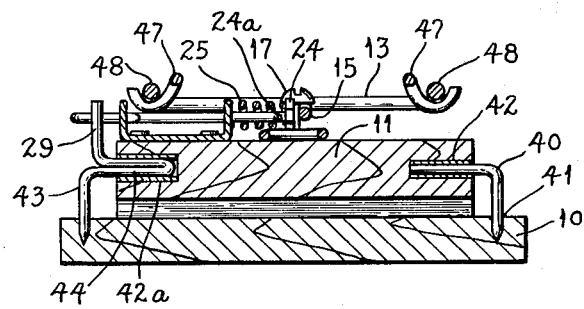
Fig. 3 is a sectional view taken on the line 3—3 of Fig. 2.
Figure 4:
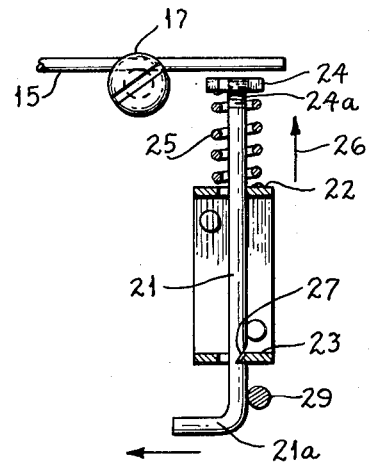
Fig. 4 is a fragmentary detail on a larger scale.

Referring to the striker bar 13, a strong helical spring 18 will encircle the inner end member 45 of the striker bar which serves as its axis of swinging. The spring may be formed of one piece of wire having a space between them in which space an inner strong connecting loop 46 is formed pressing on the trigger section 11ᵃ of the trap plate 11, and the outer ends of the spring are continued in arms 47 engaging the sides 48 of the striker bar 13 underneath thereof when the striker bar is in locked position, as shown in Figs. 1 and 2, so that when the striker bar is released, said spring arms will cause the same to descend and strike on the bait section 11ᵇ with great suddenness.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, what I claim as new and desire to protect by Letters Patent of the United States, is:

1. In an animal trap, the combination of a base, a trap plate over said base, spaced apart therefrom and being swingable on a transverse axis on said base, a striker bar over said trap plate, a transverse axis for said striker bar on said trap plate spaced apart therefrom and intermediate its ends dividing the upper surface of said trap plate into bait and trigger sections, said striker bar being adapted to swing on said axis and thereby be folded over either section of the trap plate, resilient means adapted to strongly urge said striker bar over the bait section of the trap plate, means on the trigger section on said trap plate adapted to releasably lock said striker bar on said trigger section when the same is folded thereon against the action of said resilient means, said trap plate being placed into an inclined position, said trigger section being downwardly when said striker bar is locked thereon, said bait section being adapted to receive a bait placed thereon in any position thereof, and means to transversely move said locking means and release said striker bar upon said trap plate being caused to swing downwardly at the bait section by a force acting on said bait section.

2. In a device, as set forth in claim 1, said trap plate being swingable on an axis on one side of the longitudinal center of the plate nearer to the trigger end thereof than the bait end thereof, whereby a quick swinging of the plate is facilitated when a force is acting on said bait section.

3. In a device, as set forth in claim 1, said resilient means urging the striker bar over the bait section including a coil spring coaxial with the transverse axis of the striker bar, one end of the spring pressing on said trap plate and the other end on a side of the striker bar.

4. In a device, as set forth in claim 3, a spring having spaced apart coils on said axis for swinging the striker bar the inner ends thereof pressing on said trap plate and the outer ends on the respective sides of the striker bar.

5. In a device, as set forth in claim, said means to releasably secure the striker bar on the trigger section including, a trigger arranged longitudinally over said trigger section of the trap plate, means to pivotally secure the outer end of said trigger adjacent to the outer end of said trigger section, means on said trigger section to transversely releasably lock the inner end of said trigger on said striker bar when said striker bar is folded over said trigger section and thereby keep said striker bar releasably locked thereon, and means to move said trigger transversely and release the same and the striker bar when the trap plate is inclined downwardly at the bait section.

6. In a device, as set forth in claim 5, said means to secure the inner end of said trigger in a transversely releasable manner comprising a screw secured in the trigger section having a head under or out of which the inner end of the trigger is movable, said means to transversely move said trigger including a trigger actuating pin transversely movable over the trigger section, its inner end registering with the inner end of the trigger when the same is in a locking position but being spaced apart therefrom, spring means to urge said transverse actuating pin towards said trigger, locking means for said trigger actuating pin preventing a transverse movement thereof, and a stationary member on said base, said trigger actuating pin being engaged by said stationary member and released from its locking means when the trap plate is declined towards the bait section.

7. In a device, as set forth in claim 5, said means to secure the inner end of said trigger in a transversely releasable manner comprising a screw secured in the trigger section having a head under or out of which the inner end of the trigger is movable.

8. In a device, as set forth in claim 6, said means to transversely move said trigger including a trigger actuating pin transversely movable over the trigger section, its inner end registering with the inner end of the trigger when the same is in a locking position but being spaced apart therefrom, spring means to urge said transverse actuating pin towards said trigger, locking means for said trigger actuating pin preventing a transverse movement thereof, and a stationary member on said base, said trigger actuating pin being engaged by said stationary member and released from its locking means when the trap plate is declined towards the bait section, said means to adapt said trigger actuating pin to move transversely and to urge it in said direction including a stationary guide for the actuating pin on said trigger section, a nut threaded on the inner end of the actuating pin, and a coil spring between said guide and said nut having a tendency to urge said nut towards said trigger.

9. In a device, as set forth in claim 6, said means to transversely move said trigger including a trigger actuating pin transversely movable over the trigger section, its inner end registering with the inner end of the trigger when the same is in a locking position but being spaced apart therefrom, spring means to urge said transverse pin towards said trigger, locking means for said trigger threaded actuating pin preventing a transverse movement thereof, and a stationary member on said base, said trigger threaded actuating pin being engaged by said stationary member and released from its locking means when the trap plate is declined towards the bait section, said means to adapt said trigger threaded actuating pin to move transversely and to urge it in said direction including a stationary guide for the threaded actuating pin on said trigger section, a nut on the inner end of the pin screwed on threads thereon, and a coil spring between said guide and said nut having a tendency to urge said nut towards said trigger, said means to releasably secure said trigger threaded actuating pin including a stationary guide on said trigger section having a throughgoing recess through which said pin may move, a slot in said threaded actuating pin adapted to be hooked on said guide and said stationary member being adapted to move said threaded actuating pin out of engagement with its guide when said trap plate is inclined toward the bait section.

10. In an animal trap, the combination of a base, a trap plate mounted on said base for rocking back and forth movement, a striker bar swingably mounted on said trap plate intermediate the ends thereof, resilient means urging said striker bar toward an extreme position of its swinging movement, a trigger for releasably holding said striker bar in its other extreme position of movement when said trap plate is in one extreme position of its rocking movement, and means on said trap plate to transeversely move said trigger and release said striker bar upon said trap plate being caused to move toward its other extreme position of rocking movement.

11. The combination of claim 10, in combination with means on said base to conceal the open space intermediate said base and said trap plate when the latter is in said one extreme position of its rocking movement.

ANDREW W. SALOKAR.

References Cited in the file of this patent

UNITED STATES PATENTS

| Number | Name | Date |
|---|---|---|
| 725,040 | Chasse | Apr. 14, 1903 |
| 2,144,956 | Arndt | Jan. 24, 1939 |